(12) United States Patent
Chang

(10) Patent No.: US 11,890,804 B1
(45) Date of Patent: Feb. 6, 2024

(54) EDGE BANDING MACHINE

(71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 0 days.

(21) Appl. No.: 17/881,334

(22) Filed: Aug. 4, 2022

(51) Int. Cl.
    *B32B 41/00* (2006.01)
    *B29C 63/00* (2006.01)

(52) U.S. Cl.
    CPC ...... *B29C 63/0026* (2013.01); *B29C 63/0004* (2013.01)

(58) Field of Classification Search
    CPC .................. B29C 63/0026; B29C 63/0004
    USPC ............... 156/60, 64, 350, 351, 378, 379
    See application file for complete search history.

(56) References Cited

U.S. PATENT DOCUMENTS

| | | | | |
|---|---|---|---|---|
| 10,124,536 | B1 * | 11/2018 | Jan .................. | B29C 66/80 |
| 11,485,036 | B1 * | 11/2022 | Chang .............. | B23C 3/12 |
| 2004/0154151 | A1 * | 8/2004 | Lile ................. | B65B 69/0025 |
| | | | | 83/72 |

FOREIGN PATENT DOCUMENTS

TW      I671237 B    9/2019

* cited by examiner

*Primary Examiner* — Michael N Orlando
*Assistant Examiner* — Joshel Rivera
(74) *Attorney, Agent, or Firm* — Muncy, Geissler, Olds & Lowe, P.C.

(57) ABSTRACT

An edge banding machine includes a base, and whereon a drive motor including a power outputting shaft, an edge band conveying mechanism having a pneumatic cylinder, a pushing block and an edge band conveying shaft parallel to the power outputting shaft, and a universal bearing. The pushing block is disposed at a terminal end of a telescopic rod of the pneumatic cylinder capable of being driven to lengthen or shorten to make an edge band approach or leave the edge band conveying shaft. Two ends of the universal bearing are connected with the power outputting shaft and edge band conveying shaft respectively, enabling the drive motor to rotate the edge band conveying shaft through the universal bearing. Through the configuration with the universal bearing, the edge band conveying shaft and power outputting shaft can be quickly connected for the completion of the whole edge banding machine assembly.

10 Claims, 7 Drawing Sheets

EDGE BANDING MACHINE

BACKGROUND OF THE INVENTION

1. Field of the Invention

The present invention relates to an edge banding machine and more particularly, to an improved edge banding machine, which has the advantage that each inner mechanism of the edge banding machine is easy for assembly.

2. Description of the Related Art

As to the traditional edge banding machine, refer to Taiwan Patent No. 1671237, the application of which was made by the applicant of the present invention. Refer to FIG. 1, wherein an edge banding machine is illustrated, which includes a base 10, a set of slideway 20, a positioning pressing wheel set 30 and a plurality of other mechanisms including a pre-milling mechanism 40, a glue applying mechanism 50, an edge band conveying mechanism 60, a horizontal pressing wheel set 70 and a bottom trimming mechanism 80. The slideway 20 is movably disposed on the base 10. The positioning pressing wheel set 30 is disposed above the slideway 20. A workpiece to be processed (not shown) is clipped between the slideway 20 and the positioning pressing wheel set 30, and can be moved. The pre-milling mechanism 40 performs a preliminary processing to the surface of the workpiece. The glue applying mechanism 50 applies glue to the surface of the workpiece. The edge band conveying mechanism 60 is adapted to convey an edge band to the workpiece applied with the glue. Then, the edge banding machine cuts off the edge band by a cutter (not shown) and tightly presses the cut-off edge band to the surface of the workpiece applied with the glue by the horizontal pressing wheel set 70, so as to combine the cut-off edge band with the workpiece applied with the glue tightly. At last, the edge banding machine trims edges of the edge band by an edge band fine trimming mechanism which usually includes a top trimming mechanism (not shown) and the bottom trimming mechanism 80, so as to trim off the superfluous part of the cut-off edge band and chamfer the edges of the edge band.

However, the traditional edge band conveying mechanism 60 is relatively more complicated in configuration design. Besides, the traditional edge band conveying mechanism 60 usually needs to be additionally installed with other gear sets, so that it can be synchronously moved with other mechanisms of the edge banding machine, thereby making the whole edge banding process performed smoothly. It can be known that the traditional edge banding machine has a problem in configuration design that relatively more components are used, which also derives another problem of relatively more complicated assembly, so that the manufacturing cost of the whole edge banding machine will be raised.

SUMMARY OF THE INVENTION

It is one of the objectives of the present invention to make an improvement against the defects of the presently available edge banding machine, so as to bring up a brand-new configuration design of edge banding machine, which has the advantage of relatively easier assembly.

Therefore, an edge banding machine provided according to the present invention is adapted to attach an edge band to a workpiece. The aforementioned edge banding machine includes a base, a drive motor, an edge band conveying mechanism, and a universal bearing. The drive motor is disposed on the aforementioned base and includes a power outputting shaft. The edge band conveying mechanism is disposed on the aforementioned base and has a pneumatic cylinder, a pushing block and an edge band conveying shaft. The edge band conveying shaft is disposed parallel to the power outputting shaft. The pneumatic cylinder has a telescopic rod. The pushing block is disposed at a terminal end of the telescopic rod. The telescopic rod is able to be driven to lengthen or shorten to make the edge band approach or leave the edge band conveying shaft. Two opposite ends of the universal bearing are connected with the power outputting shaft and the edge band conveying shaft respectively, so that through the aforementioned universal bearing, the drive motor can drive the edge band conveying shaft to rotate.

Through the above-described configuration design of the edge banding machine, it has no need in assembly to strictly require the edge band conveying mechanism and drive motor of the edge banding machine to be disposed coaxially, as long as the edge band conveying shaft of the edge band conveying mechanism and the power outputting shaft of the drive motor are disposed parallel to each other. After that, the assembler only has to connect the aforementioned edge band conveying shaft and power outputting shaft by the universal bearing to enable the drive motor to drive the edge band conveying mechanism to rotate. Therefore, the assembly of the whole edge banding machine is simple and requires no use of the traditional gear set, so this part of cost can be saved.

In one of the aspects, the edge banding machine may also include a glue applying mechanism. The glue applying mechanism may be disposed on the base and located on a side of the edge band conveying mechanism. The glue applying mechanism may structurally have a glue tub and a glue shaft. The glue shaft is rotatably disposed in the glue tub, and a bottom end of the glue shaft is located out of the glue tub. The edge banding machine also includes a chain. The chain is connected with the glue shaft and the power outputting shaft, so the power outputting shaft and the glue shaft can be rotated synchronously by the same drive motor, not only convenient to control the glue applying mechanism and the edge band conveying mechanism, but also able to lower the component cost of the whole.

In another aspect, although the pneumatic cylinder is adopted in the present invention, it can be replaced by a hydraulic cylinder or other types of linear actuators, unlimited to the present invention.

Specifically, the universal bearing may structurally include an upper tube portion, a pivotably connecting portion and a lower tube portion. A bottom end of the edge band conveying shaft is contained in the upper tube portion. A top end of the power outputting shaft is contained in the lower tube portion. A top end of the pivotably connecting portion is pivotably connected with the upper tube portion in a way that the pivotably connecting portion is transversely swingable relative to the upper tube portion. A bottom end of the pivotably connecting portion is pivotably connected with the lower tube portion in a way that the lower tube portion is transversely swingable relative to the pivotably connecting portion.

In another aspect, for enhancing the assembly efficiency of each mechanism of the edge banding machine, the base of the edge banding machine may also have a quick release seat. The glue applying mechanism is detachably disposed on the quick release seat, and the quick release seat also includes a through hole and a lower bearing. The lower bearing is disposed in the through hole on the base. The lower bearing is sleeved onto the power outputting shaft. Through the quick release seat, it is convenient for the constructor to assemble the edge band conveying mechanism and the glue applying mechanism, making the whole assembly performed smoothly.

In another aspect, the edge band conveying mechanism also includes at least one upper bearing. The upper bearing is disposed at a bottom end of the pushing block and abutted against the edge band, lowering the friction between the pushing block and the edge band, thereby smoothly conveying the edge band.

In another aspect, the edge band conveying mechanism also structurally includes a position limiting plate. The position limiting plate is provided with an opening. The pushing block and the edge band conveying shaft are located on two opposite sides of the position limiting plate respectively. The edge band passes through the aforementioned opening.

BRIEF DESCRIPTION OF THE DRAWINGS

The detailed structure, features, assembling or using manner related to the edge banding machine will be described in the following embodiment. However, it should be understood that the embodiment to be described in the following and the figures are given by way of illustration only, not limitative of the claimed scope of the present invention, and wherein:

DETAILED DESCRIPTION OF THE INVENTION

The technical content and features of the present invention will be described in detail by the following embodiment in coordination with the figures. The directional terms mentioned in the content of the specification, such as 'upper', 'lower', 'inside', 'outside', 'top', and 'bottom', are just for illustrative description on the basis of normal usage direction, not intended to limit the claimed scope.

For the detailed description of the technical features of the present invention, the following preferred embodiment is instanced and illustrated in coordination with the figures.

Figure 1:
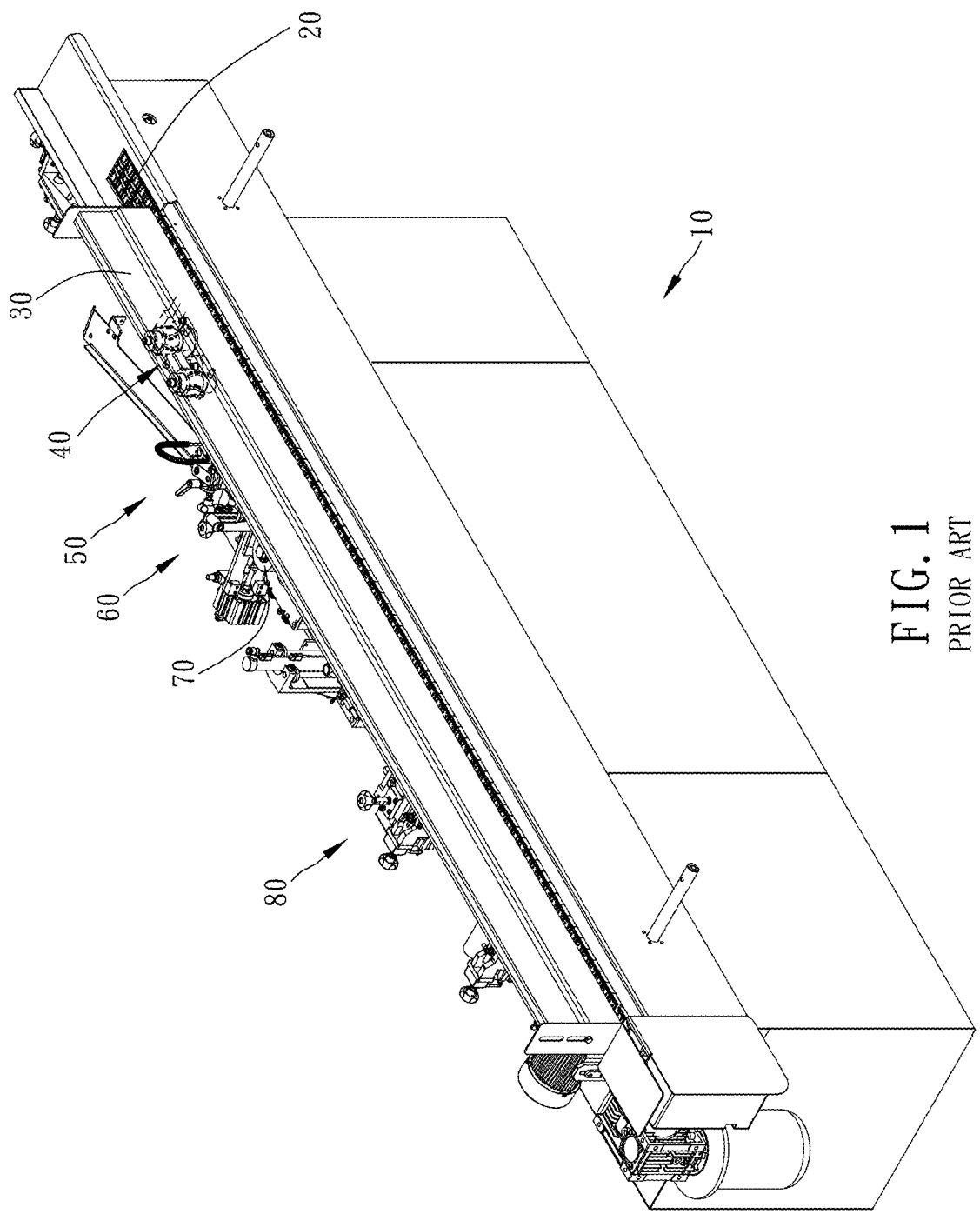
FIG. 1 is a perspective view of a conventional edge banding machine.
Figure 2:
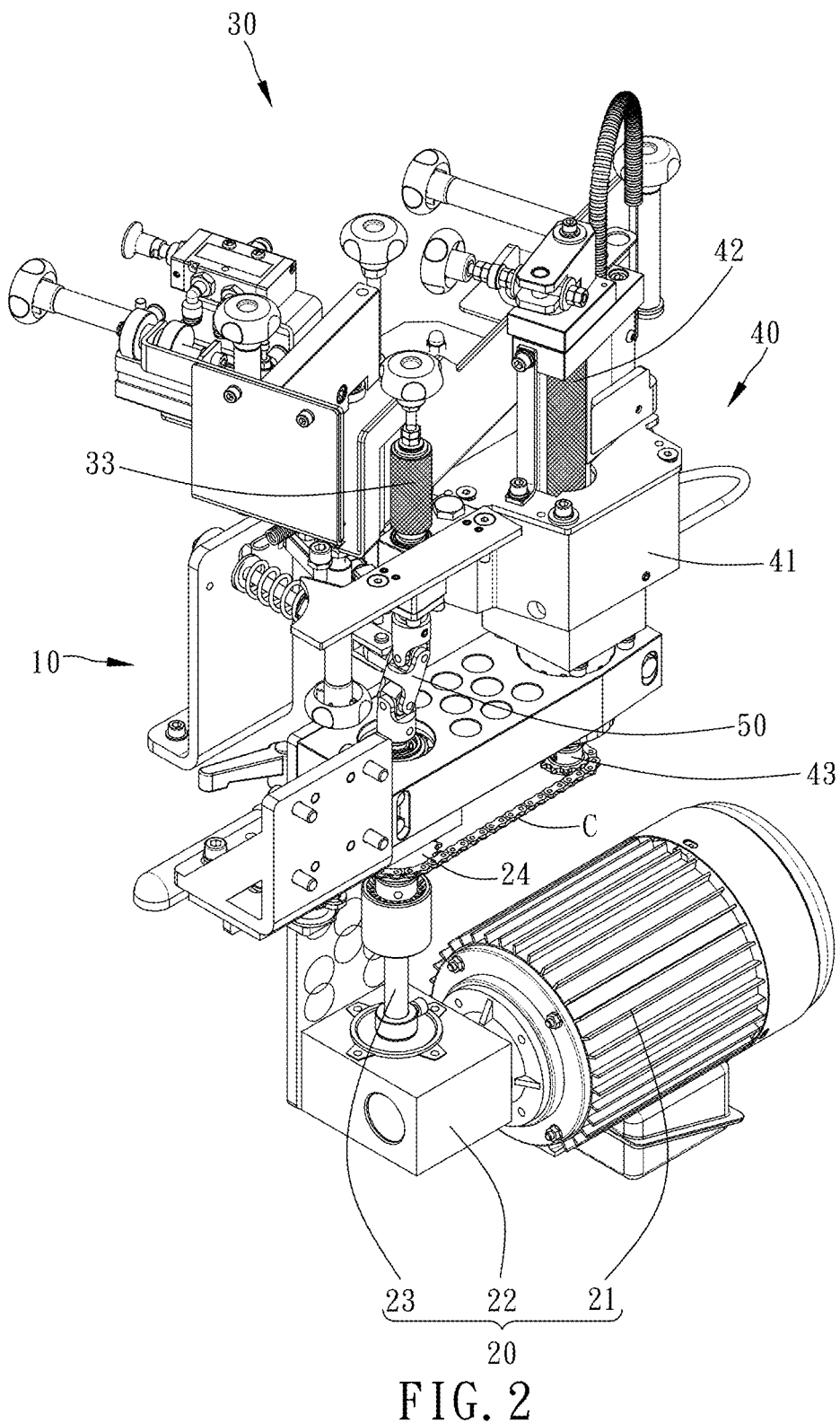
FIG. 2 is a partial perspective view of an edge banding machine of an embodiment.

As shown in FIG. 2, an edge banding machine according to an embodiment of the present invention is adapted to attach an edge band B to a workpiece (not shown). The edge banding machine includes a base 10, a drive motor 20, an edge band conveying mechanism 30, a glue applying mechanism 40, and a universal bearing 50.

Wherein, the base 10 is adapted for the installation of the aforementioned drive motor 20, edge band conveying mechanism 30, glue applying mechanism 40, and other various mechanisms such as horizontal pressing wheel set and top and bottom trimming mechanisms.

The drive motor 20 is disposed on the base 10 for driving the edge band conveying mechanism 30 and the glue applying mechanism 40. The drive motor 20 structurally includes a motor main body 21, a decelerator 22 and a power outputting shaft 23. The motor main body 21 is connected with the decelerator 22. The decelerator 22 outputs power through the power outputting shaft 23 to drive the edge band conveying mechanism 30 and the glue applying mechanism 40. A first chain wheel 24 is sleeved onto the power outputting shaft 23.

Figure 3:
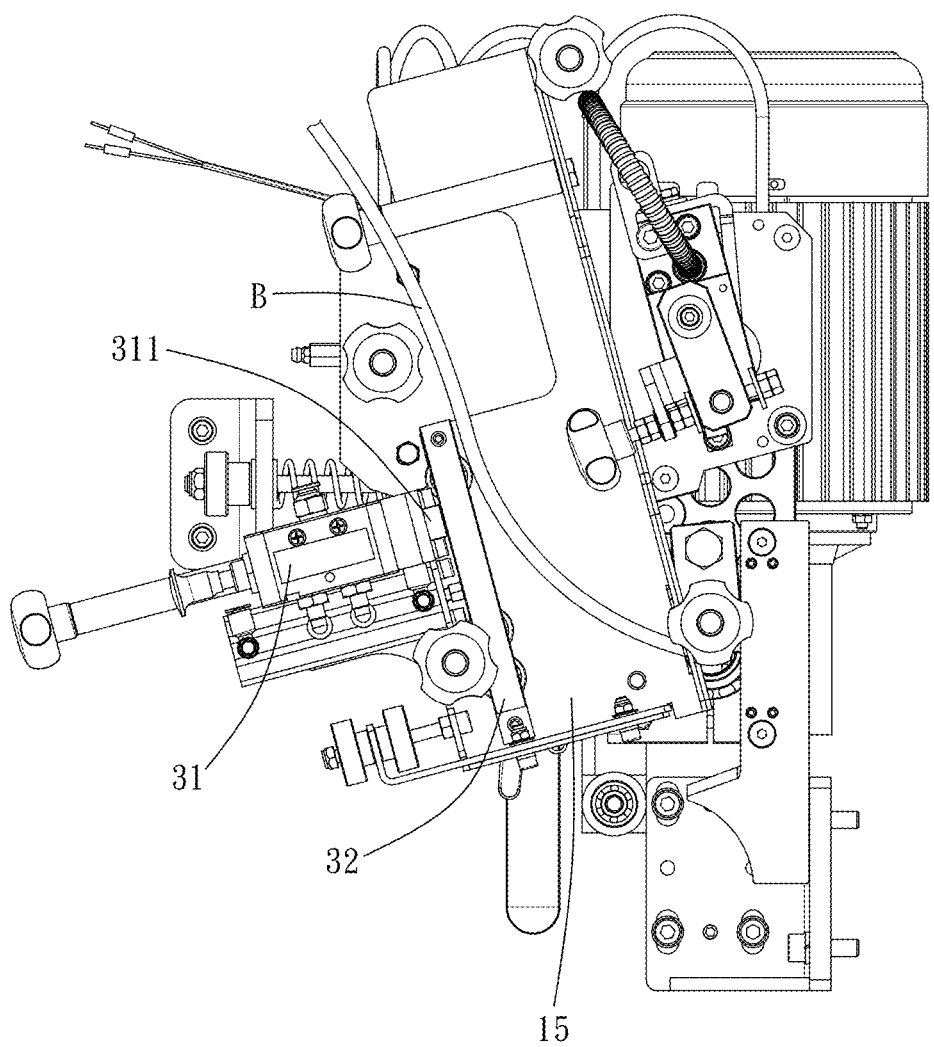
FIG. 3 is a top view of FIG. 2.
Figure 5:
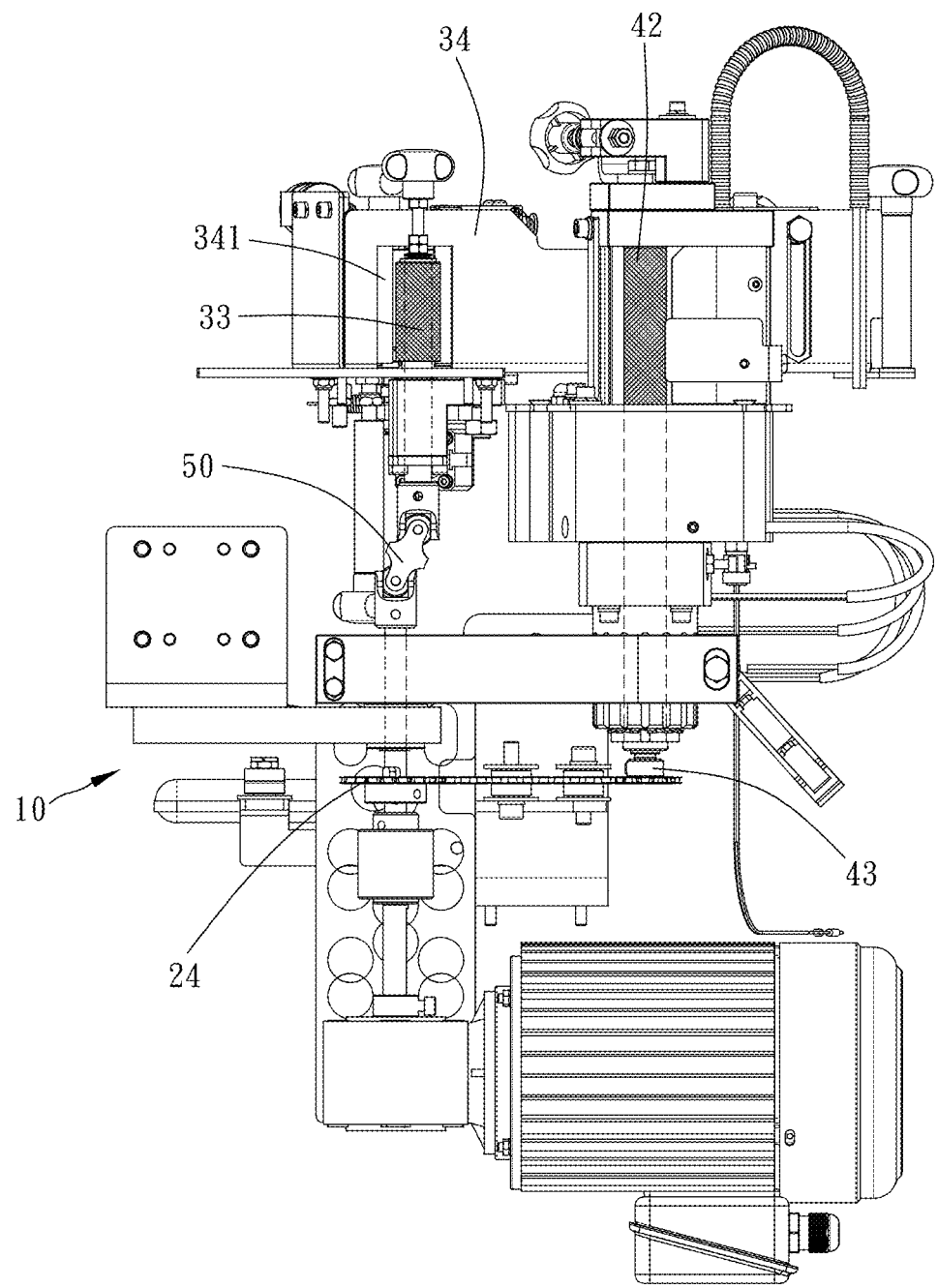
FIG. 5 is a side view of FIG. 2.
Figure 7:
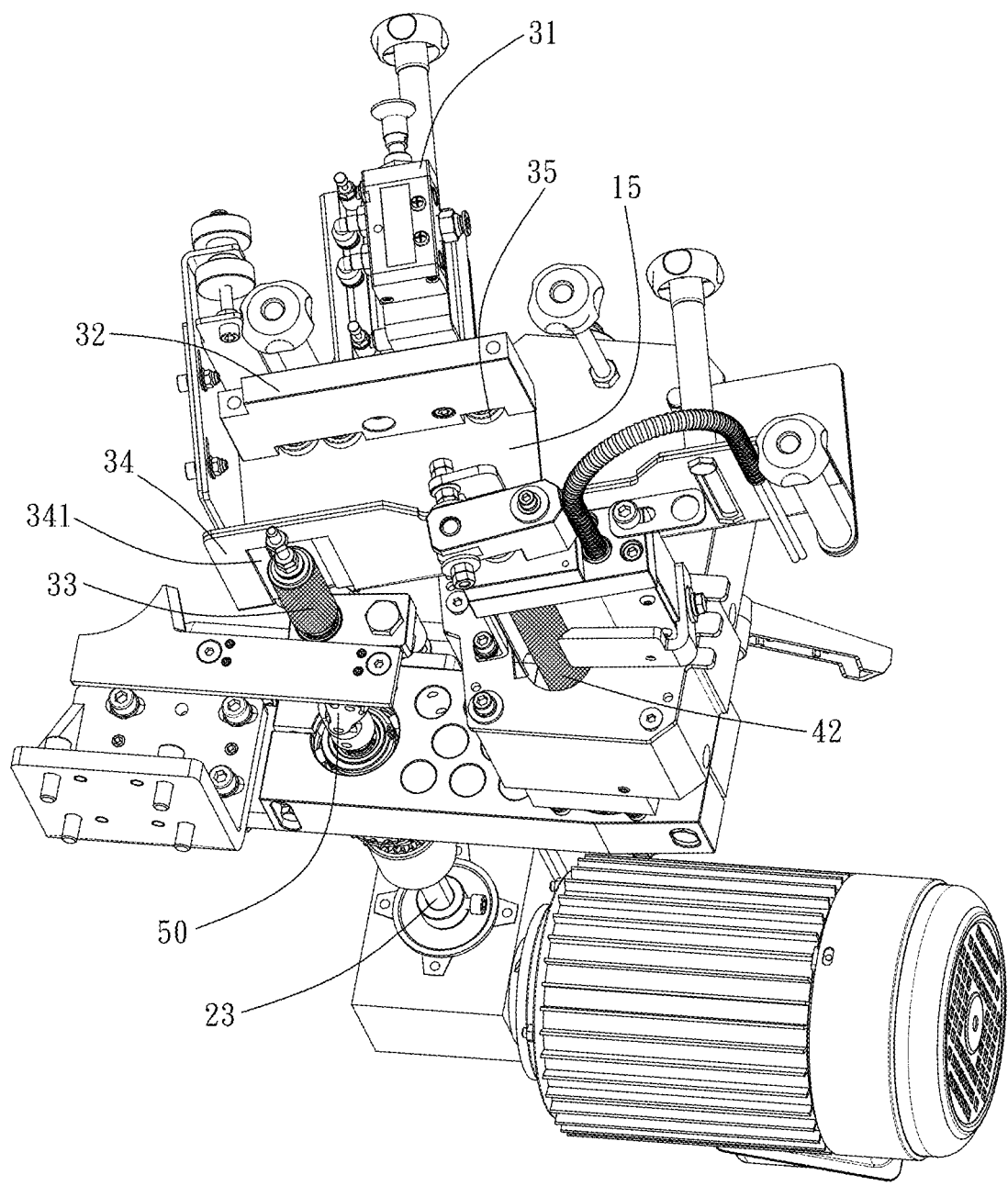
FIG. 7 is another partial perspective view of the edge banding machine of the embodiment.

Referring to FIG. 3, FIG. 5 and FIG. 7, the edge band conveying mechanism includes a pneumatic cylinder 31, a pushing block 32, an edge band conveying shaft 33 and a position limiting plate 34. The pneumatic cylinder 31 is installed on a supporting frame 15 of the base 10. The pneumatic cylinder 31 has a telescopic rod 311. The pushing block 32 is disposed at a terminal end of the telescopic rod 311. Besides, in this embodiment, three upper bearings 35 (shown in FIG. 7) are disposed below the pushing block 32. The upper bearings 35 are rotatably attached to the pushing block 32, and the upper bearings 35 are adapted to be abutted against the edge band B. The edge band conveying shaft 33 is disposed on the base 10 rotatably in situ, and the edge band conveying shaft 33 is disposed parallel to the power outputting shaft 23. As shown in FIG. 5, the edge band conveying shaft 33 and the power outputting shaft 23 are not disposed coaxially, but transversely offset from each other. The position limiting plate 34 is disposed upright on the supporting frame 15, and the position limiting plate 34 has an opening 341 (shown in FIG. 7). The pushing block 32 and the edge band conveying shaft 33 are located on two opposite sides of the position limiting plate 34 respectively. The edge band B extends on the supporting frame 15 and passes through the opening 341. When the pneumatic cylinder 31 drives the telescopic rod 311 to lengthen the telescopic rod 311, the pushing block 32 is driven to approach the edge band conveying shaft 33. The edge band B is pushed by the pushing block 32 to approach the edge band conveying shaft 33, so that the edge band B and a top end portion of the edge band conveying shaft 33 are in contact with each other. Therefore, the edge band B can be conveyed by the edge band conveying shaft 33 in the direction away from the glue applying mechanism 40, thereby combined with the workpiece applied with glue. When the pneumatic cylinder 31 drives the telescopic rod 311 to shorten the telescopic rod 311, the pushing block 32 is driven to leave the edge band conveying shaft 33. The edge band B will leave the edge band conveying shaft 33, so that the edge band B is not in contact with the top end portion of the edge band conveying shaft 33. Therefore, the edge band conveying shaft 33 cannot convey the edge band B.

Figure 6:
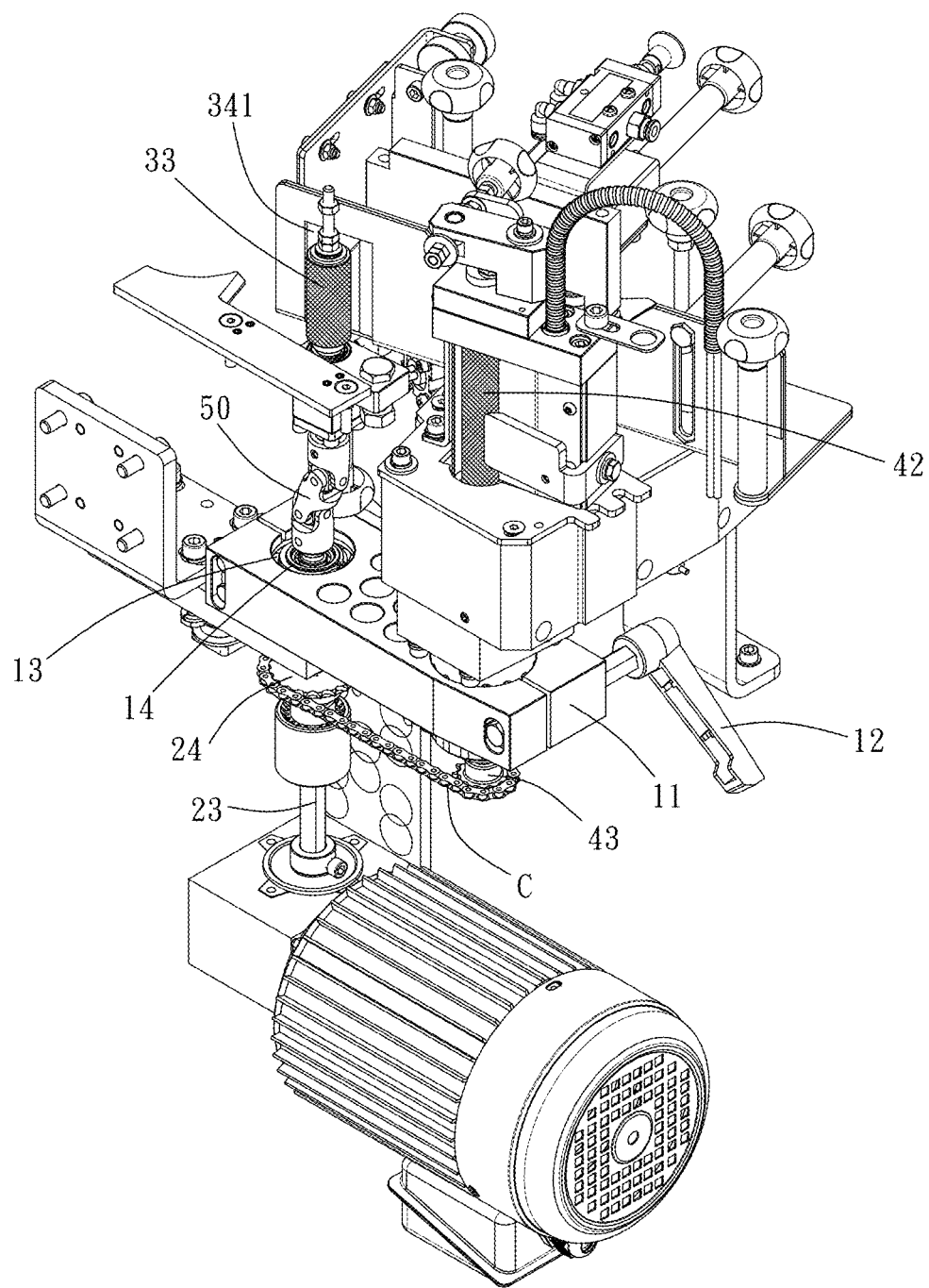
FIG. 6 is a perspective view of another angle of the edge banding machine of the embodiment.

As shown in FIG. 2 and FIG. 6, the glue applying mechanism 40 is disposed on the base 10 and located on a side of the edge band conveying mechanism 30. The glue applying mechanism 40 has a glue tub 41 and a glue shaft 42. The glue tub 41 is provided therein with glue. When the glue in the glue tub 41 is heated to a specific temperature, the glue will be molten into colloid. The glue shaft 42 is rotatably disposed in the glue tub 41 and a bottom end of the glue shaft 42 is located out of the glue tub 41. The glue shaft 42 is adapted to extract the colloidal glue. The glue shaft 42, edge band conveying shaft 33 and power outputting shaft 23 are disposed parallel to each other. A second chain wheel 43 is sleeved onto the bottom end of the glue shaft 42. The edge banding machine also includes a chain C. The chain C is connected with the first chain wheel 24 on the power outputting shaft 23 and the second chain wheel 43 on the glue shaft 42. Therefore, when the power outputting shaft 23 of the drive motor 20 rotates, the power outputting shaft 23 and the glue shaft 42 rotate synchronously.

Besides, in this embodiment, as shown in FIG. 6, the base 10 also includes a quick release seat 11 and a quick release member 12. The glue applying mechanism 40 is detachably disposed on the quick release seat 11 by the quick release member 12, which is convenient for the assembler to install the glue applying mechanism 40 on the quick release seat 11 of the base 10. On the other hand, another side of the quick release seat 11 is provided with a through hole 13. The through hole 13 is provided therein with a lower bearing 14. The power outputting shaft 23 passes through the aforementioned through hole 13, and the lower bearing 14 is sleeved onto the power outputting shaft 23, which is convenient for the assembler to install the drive motor 20 on the quick release seat 11 of the base 10.

Figure 4:
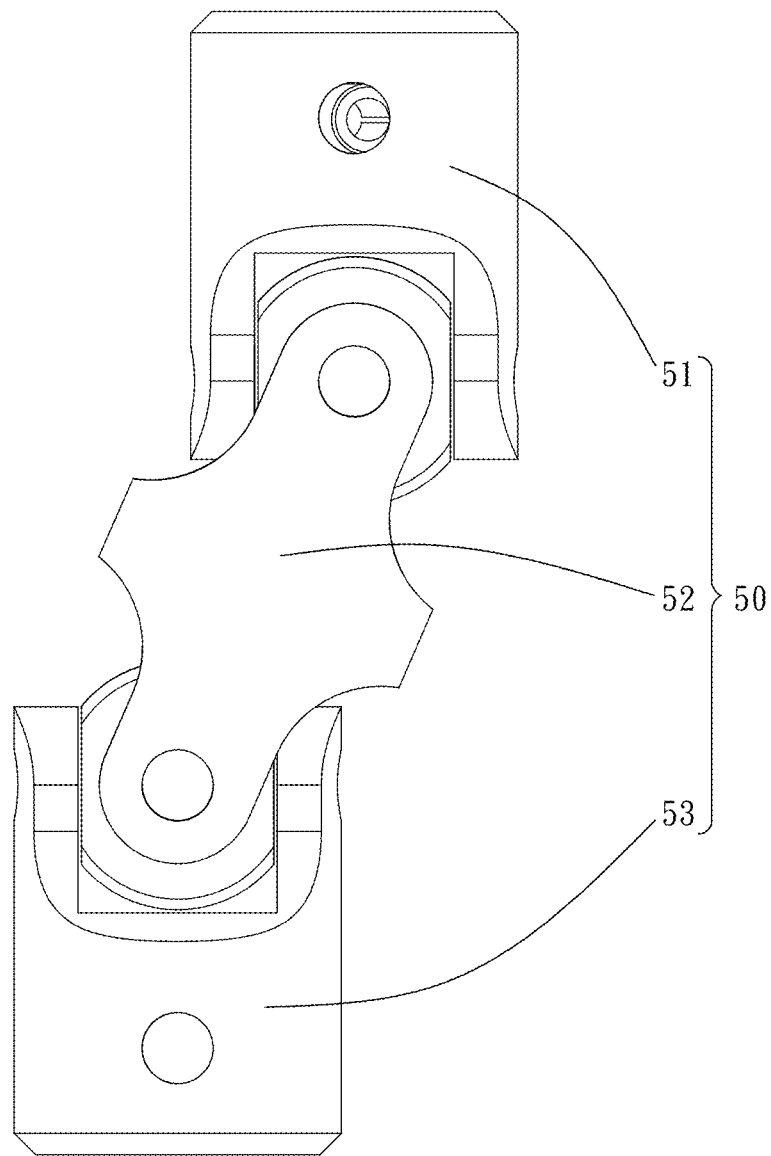
FIG. 4 is a side view of a universal bearing of the embodiment.
Figure 4:
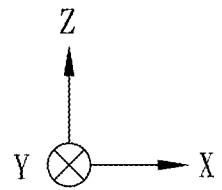

Referring to FIG. 2, FIG. 4 and FIG. 5, the universal bearing 50 includes an upper tube portion 51, a pivotably connecting portion 52 and a lower tube portion 53. The bottom end of the edge band conveying shaft 33 is contained in the upper tube portion 51. The top end of the power outputting shaft 23 is contained in the lower tube portion 53. The top end of the pivotably connecting portion 52 is pivotably connected with the upper tube portion 51 in a way that the pivotably connecting portion 52 is transversely swingable relative to the upper tube portion 51. The bottom end of the pivotably connecting portion 52 is pivotably connected with the lower tube portion 53 in a way that the lower tube portion 53 is transversely swingable relative to the pivotably connecting portion 52.

Through the above-described configuration design of the edge banding machine, it has no need in assembly to strictly require the edge band conveying mechanism 30 and drive motor 20 of the edge banding machine to be disposed coaxially. The assembler only has to install the power outputting shaft 23 of the drive motor 20 and the glue applying mechanism 40 on the quick release seat 11, and make the edge band conveying shaft 33 of the edge band conveying mechanism 30 and the power outputting shaft 23 of the drive motor 20 disposed parallel to each other. After that, the assembler only has to connect the aforementioned edge band conveying shaft 33 and power outputting shaft 23 by the universal bearing 50 to enable the drive motor 20 to drive the edge band conveying mechanism 30 and glue applying mechanism 40 to operate at the same time. The assembly of the whole edge banding machine is simple and requires no use of the traditional gear set, so this part of cost can be saved.

At last, it should be mentioned again that the method and constituent elements disclosed in the above embodiment of the present invention are only taken as examples for illustration, not intended to limit the scope of the present invention. The simple structural retouch or variations, or substitution of other equivalent elements, which are not to be regarded as a departure from the spirit of the invention, should be included within the scope of the following claims of the present invention.

What is claimed is:

1. An edge banding machine, which is adapted to attach an edge band to a workpiece, the edge banding machine comprising:
    a base;
    a drive motor disposed on the base and comprising a power outputting shaft;
    an edge band conveying mechanism disposed on the base and having a pneumatic cylinder, a pushing block and an edge band conveying shaft, the edge band conveying shaft being disposed parallel to the power outputting shaft, the pneumatic cylinder having a telescopic rod, the pushing block being disposed at a terminal end of the telescopic rod, the telescopic rod being able to be driven to lengthen or shorten to make the edge band approach or leave the edge band conveying shaft;
    a universal bearing, two opposite ends of which are connected with the power outputting shaft and the edge band conveying shaft respectively.

2. The edge banding machine as claimed in claim 1, further comprising a glue applying mechanism, the glue applying mechanism being disposed on the base and located on a side of the edge band conveying mechanism, the glue applying mechanism having a glue tub and a glue shaft, the glue shaft being rotatably disposed in the glue tub and a bottom end of the glue shaft being located out of the glue tub, the edge banding machine also comprising a chain, the chain being connected with the glue shaft and the power outputting shaft in a way that the power outputting shaft and the glue shaft are rotatable synchronously.

3. The edge banding machine as claimed in claim 2, wherein the drive motor also has a first chain wheel; the first chain wheel is sleeved onto the power outputting shaft; the glue applying mechanism also has a second chain wheel; the second chain wheel is sleeved onto the glue shaft; the chain links the first chain wheel with the second chain wheel.

4. The edge banding machine as claimed in claim 2, wherein the base also has a quick release seat; the glue applying mechanism is detachably disposed on the quick release seat; the quick release seat also comprises a through hole; a lower bearing is disposed in the through hole; the lower bearing is sleeved onto the power outputting shaft.

5. The edge banding machine as claimed in claim 4, wherein the universal bearing comprises an upper tube portion, a pivotably connecting portion and a lower tube portion; a bottom end of the edge band conveying shaft is contained in the upper tube portion; a top end of the power outputting shaft is contained in the lower tube portion; a top end of the pivotably connecting portion is pivotably connected with the upper tube portion in a way that the pivotably connecting portion is transversely swingable relative to the upper tube portion; a bottom end of the pivotably connecting portion is pivotably connected with the lower tube portion in a way that the lower tube portion is transversely swingable relative to the pivotably connecting portion.

6. The edge banding machine as claimed in claim 3, wherein the universal bearing comprises an upper tube portion, a pivotably connecting portion and a lower tube portion; a bottom end of the edge band conveying shaft is contained in the upper tube portion; a top end of the power outputting shaft is contained in the lower tube portion; a top end of the pivotably connecting portion is pivotably connected with the upper tube portion in a way that the pivotably connecting portion is transversely swingable relative to the upper tube portion; a bottom end of the pivotably connecting portion is pivotably connected with the lower tube portion in a way that the lower tube portion is transversely swingable relative to the pivotably connecting portion.

7. The edge banding machine as claimed in claim 2, wherein the universal bearing comprises an upper tube portion, a pivotably connecting portion and a lower tube portion; a bottom end of the edge band conveying shaft is contained in the upper tube portion; a top end of the power outputting shaft is contained in the lower tube portion; a top end of the pivotably connecting portion is pivotably connected with the upper tube portion in a way that the pivotably connecting portion is transversely swingable relative to the upper tube portion; a bottom end of the pivotably connecting portion is pivotably connected with the lower tube portion in a way that the lower tube portion is transversely swingable relative to the pivotably connecting portion.

8. The edge banding machine as claimed in claim 1, wherein the universal bearing comprises an upper tube portion, a pivotably connecting portion and a lower tube portion; a bottom end of the edge band conveying shaft is contained in the upper tube portion; a top end of the power outputting shaft is contained in the lower tube portion; a top end of the pivotably connecting portion is pivotably connected with the upper tube portion in a way that the pivotably connecting portion is transversely swingable relative to the upper tube portion; a bottom end of the pivotably connecting portion is pivotably connected with the lower tube portion in a way that the lower tube portion is transversely swingable relative to the pivotably connecting portion.

9. The edge banding machine as claimed in claim 1, wherein the edge band conveying mechanism also comprises at least one upper bearing; the at least one upper bearing is disposed at a bottom end of the pushing block and abutted against the edge band.

10. The edge banding machine as claimed in claim 9, wherein the edge band conveying mechanism also comprises a position limiting plate; the position limiting plate has an opening; the pushing block and the edge band conveying shaft are located on two opposite sides of the position limiting plate respectively; the edge band passes through the opening.

* * * * *